(12) United States Patent
Takamori

(10) Patent No.: US 8,184,941 B2
(45) Date of Patent: May 22, 2012

(54) INFORMATION RECORDING AND REPRODUCING APPARATUS AND METHOD FOR CHANGING SETTING LANGUAGE OF THE SAME

(75) Inventor: Tomotsugu Takamori, Osaka (JP)

(73) Assignee: Funai Electric Co., Ltc., Osaka (JP)

( * ) Notice: Subject to any disclaimer, the term of this patent is extended or adjusted under 35 U.S.C. 154(b) by 1126 days.

(21) Appl. No.: 12/071,555

(22) Filed: Feb. 22, 2008

(65) Prior Publication Data

US 2008/0205855 A1    Aug. 28, 2008

(30) Foreign Application Priority Data

Feb. 26, 2007   (JP) .............................. P2007-045033

(51) Int. Cl.
  *H04N 5/92*   (2006.01)
(52) U.S. Cl. ....................................... 386/216; 386/220
(58) Field of Classification Search .................. 386/214, 386/216, 220, 261
See application file for complete search history.

(56) References Cited

U.S. PATENT DOCUMENTS

| 4,712,195 | A  | * | 12/1987 | Finger | 365/226 |
| 7,724,310 | B2 | * | 5/2010 | Higashi | 348/725 |
| 7,827,588 | B2 | * | 11/2010 | Mukaide et al. | 725/141 |
| 2002/0044222 | A1 | * | 4/2002 | Lee | 348/564 |
| 2002/0168179 | A1 | * | 11/2002 | Kikuchi et al. | 386/97 |
| 2003/0086681 | A1 | * | 5/2003 | Miyagawa | 386/34 |
| 2004/0001703 | A1 | * | 1/2004 | Kang | 386/95 |
| 2005/0191034 | A1 | * | 9/2005 | Sakon | 386/95 |
| 2006/0034590 | A1 | * | 2/2006 | Teramoto | 386/95 |
| 2006/0209892 | A1 | * | 9/2006 | MacMullan et al. | 370/468 |
| 2007/0124780 | A1 | * | 5/2007 | Lee | 725/89 |

FOREIGN PATENT DOCUMENTS

| EP | 1 519 263 A2 | 3/2005 |
| EP | 1624669 A2 * | 2/2006 |
| JP | 2004-54501 | 2/2004 |

(Continued)

OTHER PUBLICATIONS

High-Definition Multimedia Interliice, Specification Version 1.3a (Nov. 10, 2006).

*Primary Examiner* — Jung Kim
*Assistant Examiner* — Thomas Ho
(74) *Attorney, Agent, or Firm* — Morgan, Lewis & Bockius LLP

(57) ABSTRACT

An HDMI connector is adapted to be connected to a display device conforming to an HDMI standard. A signal processor is operable to decode a digital signal received through the HDMI connector and extract first language information which indicates a setting language of the display device when the digital signal contains the first language information. A storage is operable to store second language information which indicates a setting language of the information recording and reproducing apparatus. A controller is operable to detect whether the display device is connected to the HDMI connector, acquire the first language information when the display device is connected to the HDMI connector, determine whether the setting language in the first language information is in conformity with the setting language in the second language information, and change the setting language in the second language information so as to be in conformity with the setting language in the first language information when the setting languages are not in conformity with each other.

5 Claims, 4 Drawing Sheets

FOREIGN PATENT DOCUMENTS

| JP | 2004-227199 | 8/2004 |
| JP | 2005-70914 | 3/2005 |
| JP | 2005-109703 | 4/2005 |
| JP | 2006-108750 | 4/2006 |
| WO | WO 2008/056954 A1 | 5/2008 |
| WO | WO 2008056954 A1 * | 5/2008 |

* cited by examiner

INFORMATION RECORDING AND REPRODUCING APPARATUS AND METHOD FOR CHANGING SETTING LANGUAGE OF THE SAME

The disclosure of Japanese Patent Application No. 2007-045033 filed on Feb. 26, 2007 including specification, drawings and claims is incorporated herein by reference in its entirety.

BACKGROUND

The present invention relates to an information recording and reproducing apparatus such as a DVD recorder connected to a monitor conforming to an HDMI (high definition multimedia interface) standard and method for changing setting language of the information recording and reproducing apparatus, and particularly relates to the information recording and reproducing apparatus capable of automatically change a setting language so as to be in conformity with a language for displaying a setting menu of the monitor.

In some cases, a display device having a screen for displaying an image and an image outputting device which outputs image information are connected to each other. At this time, if a language used in the display device is different from a language used in the image outputting device, there arise a problem that a person who could not understand one of the languages may experience inconvenience.

Accordingly, there have been suggested a image outputting device, a image outputting method, and an information recording medium for accurately setting a display condition of image information of the display device whenever connecting the display device to the image outputting device such as a DVD reproducing apparatus (See Patent Document 1).

In this case, the image outputting device corresponds to the DVD reproducing apparatus. The display device corresponds to a television monitor conforming to an HDMI standard In addition, the HDMI standard is an interface for transmitting a digital AV signal from the DVD reproducing apparatus to the display device such as a television receiver or a projector. The HDMI standard is extended from a DVI (digital visual interface for computer) Version 1.0 which is a conventional standard. The DVI is a standard for transmitting only image information, but the HDMI standard is designed to transmit not only the image information, but also audio information or the other information. In addition, the HDMI standard can also transmit a high-quality multi-channel audio and a high-resolution image signal of various formats.

In a case where contents of a CSS (content scrambling system) are output from the DVD reproducing apparatus, the HDMI standard is authorized by the CPAC (Copy Protection Advisory Council). The CSS is a system which encodes and records data and decodes the data at the reproduction time and is provided with the DVD reproducing apparatus in order to protect a plurality of DVD video titles.

In this case, the image outputting device includes an acquiring unit (CPU) which preliminarily acquires display condition information to control an image display of an HDMI monitor, an information converter which converts image information to be output to the HDMI monitor on the basis of the display condition information, and an HDMI transmitting unit which outputs the image information converted by the information converter to the HDMI monitor.

The image information acquired from the DVD is converted by the information converter and displayed on the HDMI monitor connected to the DVD reproducing apparatus. Consequently, when a user changes the display condition acquired from the HDMI monitor, the image information can be output to the HDMI monitor in the display condition which the user has changed rather than the display condition acquired from the HDMI monitor.

Even when the HDMI monitor is connected again to the DVD reproducing apparatus, the image information can be output in the display condition which has been changed in accordance with the preference of the user without changing the setting of the display condition of the image information in accordance with the preference of the user. Accordingly, it is possible to improve convenience of the user.

There are disclosed an image display device and an image display method capable of automatically setting a display mode and reproducing an image while emphasizing preference of the user (See Patent Document 2).

The image display device includes an HDMI connector to which a digital transmission bus conforming to an HDMI standard is connected and an HDMI signal-processing unit which extracts and outputs display related information when the display-related information is included in a received digital signal. In addition, the image display device includes a selector to which a second image signal containing an image signal obtained by receiving and processing a broadcast signal and a first image signal decoded by a decoding process are input and which selectively outputs one of the first and second image signals. The image display unit also includes a display which displays an image based on the image signal which is selected by the selector and a controller which controls an operation of the display unit.

When the selector selects the first image signal and the display-related information is extracted, the controller automatically sets the display mode for the display unit in response to the display-related information. In the automatically set display mode, when a user issues a command for setting the display mode, the response by the display-related information is stopped and the display mode for the display is set in accordance with the command issued from the user as long as the state selected by the selector is not changed.

Conventionally, when an image display device receives the signal transmitted in compliance with the HDMI standard and automatically sets the image display mode, the display in accordance with user's desired mode could not be necessarily set. However, the above image display device can set the display mode for the display unit according to the setting command of the user when reproducing the image and audio signals conforming to the HDMI standard. Accordingly, it is possible to improve convenience of the automatic setting and also emphasize preference of the user.

There are disclosed a language switching system and a language switching method capable of switching a language without re-inputting a setting value when a user uses a different language (See Patent Document 3).

In the language switching system, a client computer is connected to a server computer through a network, and the language is switched according to a log-in user. The client computer includes an information transmitting unit which transmits log-in information containing a user identifier of the login user to the server computer. On the other hand, the server computer includes a user information record unit which records user information together with the user identifier, a language information record unit which records predetermined information of each language, a receiving unit which receives information from the client computer, an information acquiring unit which acquires a language in the user information corresponding to the user identifier from the user information record unit, and a transmitting unit which transmits the information acquired by the information acquiring unit to the client computer. With such a configuration, in the language information record unit, various items displayed on a display unit of the client computer are recorded with respect to each language used by each user. In addition, on the basis of the language acquired by the user information record unit, the information acquiring unit can acquire information from the language information record unit. In addition, the transmitting unit transmits the acquired information to the client computer. For this reason, the server computer can transmit, to the client compute, the predetermined information such as the various items in a suitable language with respect to each log-in user of the client computer. Consequently, even when a plurality of users using difference language uses the client computer, the languages can be switched without inputting an area setting value of an operating system every time.

There are disclosed an automatic browser display language determining system which includes a Web server for transmitting contents preliminarily stored therein to a display unit of a request source (See Patent Document 4).

The automatic browser display language determining system includes a display language determining unit and the Web server. The display language determining unit determines a language requested from the display unit on the basis of display language setting information for displaying Web contents in a language desired by a user without designation of a display language by a user at accessing time to Web server. The Web server acquires the contents in the corresponding language on the basis of the determination result and delivers the contents to the display device.

The display device notifies the Web server of the display language setting information which is preliminarily stored in a display language setting storage unit of the display device when the display unit accesses to the Web server via a network.

The display language determining unit of the Web server determines the display language on the basis of the display language setting information notified from the display unit, acquires the Web contents of the corresponding language from a contents-by-language storage unit and delivers the Web contents to the display unit. When the Web contents are transmitted from the Web server, the display unit automatically displays the Web contents on a display unit according to the display language preliminarily set in the display language setting storage unit. Consequently, the user can use the Web contents in the desired language without designation of the display language at accessing time to the Web server.

There are disclosed an information terminal device and a network system designed to obtain information displayed in the same language as that used in an application from a server in a case where the information is obtained from the server through a network system (See Patent Document 5).

The network system includes means for acquiring language information indicated in application software operating in the terminal or displayed on the display unit, a serial number of software, or a model number of a peripheral device or means for designating a display language. The network system also includes means for adding one of the language information, the serial number, the model number, and the designated language to link information and transmitting it together with the link information. With such a configuration, a language displayed on the display unit of the information terminal is designated in accordance with, for example, the software serial number. Accordingly, it is not necessary for a user to select the language displayed on the information terminal. As a result, it is possible to obtain information displayed in the same language as that used in the application even though any language is used in the application.

Patent Document 1: Japanese Patent Publication 2005-109703A

Patent Document 2: Japanese Patent Publication 2006-108750A

Patent Document 3: Japanese Patent Publication 2005-70914A

Patent Document 4: Japanese Patent Publication 2004-227199A

Patent Document 5: Japanese Patent Publication 2004-54501A

According to the Patent Document 1, the CPU acquires the image information of the EDID stored in the HDMI monitor to set the display condition when the DVD reproducing apparatus is connected to the HDMI monitor. However, the DVD reproducing apparatus does not change the display language so as to be in conformity with the language set in the HDMI monitor. Therefore, when a new DVD reproducing apparatus is connected to the HDMI monitor and the menu for performing various types of setting is displayed on the screen of the monitor, the user may not understand the initial displayed language. Consequently, the setting operation cannot proceed, thereby resulting in inconvenience.

According to the Patent Document 2, since the display mode for the display unit is set in accordance with the setting command of the user, it is possible to improve the convenience of the automatic setting and also emphasize the preference of the user. However, the system does not change the display language of the DVD reproducing apparatus so as to be in conformity with the setting language in the HDMI. Therefore, as mentioned above, when a new DVD reproducing apparatus is connected to the HDMI monitor, the user may not understand the initial displayed language. Consequently, the setting operation may not be performed, thereby resulting in inconvenience.

Further, the Patent Documents 3 to 5 do not disclose a structure in which a DVD) recorder is connected to the AV device for displaying an image on a screen and output audio from a speaker and the display language of the AV device is arbitrarily changed Therefore, these systems cannot solve a problem in that when a language such as used in a menu or a caption displayed on the screen of the AV device including the HDMI monitor is different from a language used in the DVD recorder, the languages may not be understood.

SUMMARY

Accordingly, it is an object of the invention to provide an information recording and reproducing apparatus which is capable of automatically setting a use language so as to be in conformity with a language used in a menu or the like displayed on an image display device such as a television monitor in order to considerably improve user convenience.

In order to achieve the above objects, according to an aspect of the invention, there is provided an information recording and reproducing apparatus comprising; an HDMI connector adapted to be connected to a display device conforming to an HDMI standard; a signal processor operable to decode a digital signal received through the HDMI connector and extract first language information which indicates a setting language of the display device when the digital signal contains the first language information; a storage operable to store second language information which indicates a setting language of the information recording and reproducing apparatus; a controller operable to detect whether the display device is connected to the HDMI connector, acquire the first language information when the display device is connected to the HDMI connector, determine whether the setting language in the first language information is in conformity with the setting language in the second language information, and change the setting language in the second language information so as to be in conformity with the setting language in the first language information when the setting languages are not in conformity with each other.

The display device may include a television monitor. The display device may include an AV device provided with an audio output unit. A menu or a caption in visual information output from the recording and reproducing apparatus to the display device may be displayed on a screen of the display device in the setting language in the second language information.

According to another aspect of the invention, there is also provided a method for changing a setting language of an information recording and reproducing apparatus, comprising: detecting whether a display device conforming to an HDMI standard is connected to an HDMI connector in the information recording and reproducing apparatus; receiving a digital signal from the display device through the HDMI connector; extracting language information which indicates a setting language of the display device from the digital signal; determining whether the setting language of the display device is in conformity with the setting language of the information recording and reproducing apparatus; and changing the setting language of the information recording and reproducing apparatus so as to be in conformity with the setting language of the display device when the setting languages are not in conformity with each other.

When the HDMI connector is connected to the display device, as described above, the information recording and reproducing apparatus according to the aspect of the invention changes the language displayed in the screen so as to be in conformity with the setting language of the display device when the setting language of the display device is different from the setting language of the information recording and reproducing apparatus. When a new information recording and reproducing apparatus is connected to the display device, the language used by a user (i.e. the setting language of the display device) is automatically displayed on the screen. As a result, it is possible to prevent the inconvenience due to the non-understandable language from occurring.

Moreover, when the display device is the television monitor, it is possible to solve the problem that various setting operations could not be performed and the television monitor could not be effectively used.

Moreover, when the display device is the AV device which includes the audio output unit, it is possible to solve the problem that the setting operation is not appropriately performed and the AV device could not be effectively used.

Furthermore, the various setting operations can be appropriately performed in the menu at the using time and the display image can be easily understood upon viewing the caption displayed on the screen.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE EMBODIMENTS

Hereinafter, an embodiment of the invention will be described with reference to the drawings.

Figure 1:
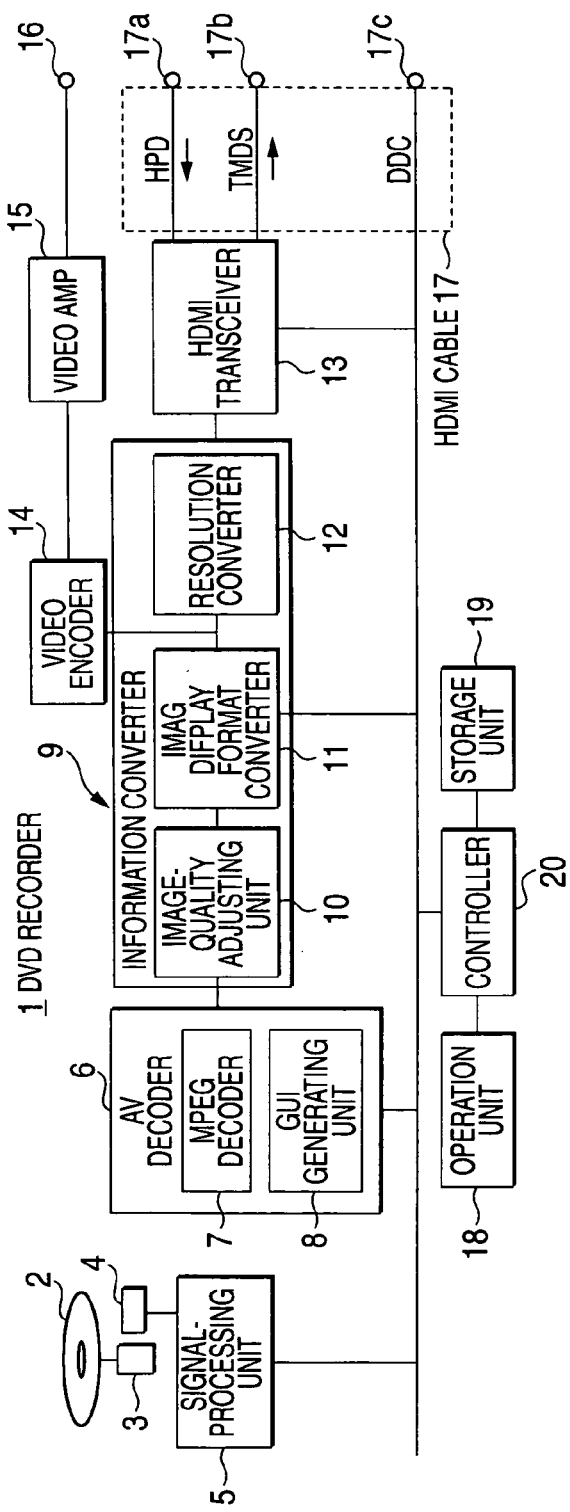
FIG. 1 is a block diagram illustrating an overall electrical configuration of an information recording and reproducing apparatus according to an embodiment of the present invention.
Figure 2:
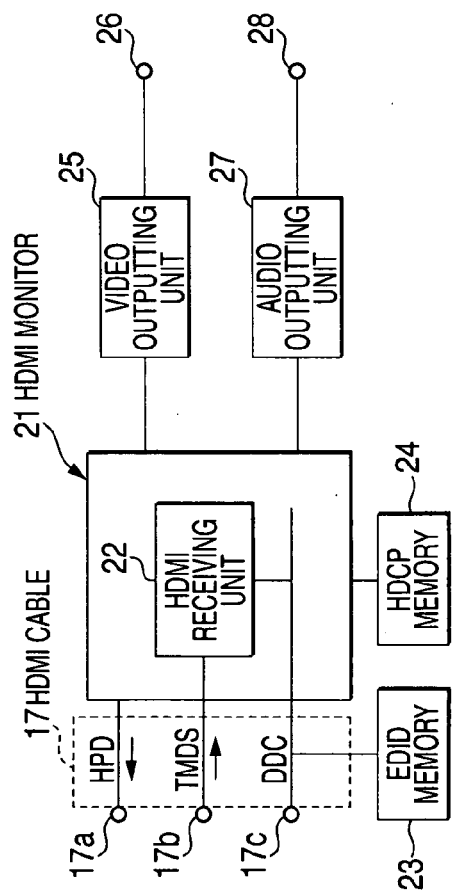
FIG. 2 is a block diagram illustrating an overall electrical configuration of an HDMI monitor according to the embodiment.

As shown in FIGS. 1 and 2, the information recording and reproducing apparatus records image and audio data in an optical disk (DVD) 2 and is applied to a DVD recorder 1 which reproduces the record data. The information recording and reproducing apparatus is connected to an HDMI monitor 21 through HDMI connectors 17a to 17c and an HDMI cable 17. In the DVD recorder 1, an operation unit 18, a display main unit, and the like are disposed in a front panel (not shown) forming a device body and a terminal unit including a connection terminal of a USB form is disposed in a rear panel Various types of mechanisms related to recording and reproducing functions and various types of circuit units are received in a main body of the DVD recorder 1.

The DVD recorder 1 generally includes a DVD-driving unit 3, a signal-reading unit 4, a signal-processing unit 5, an AV decoder 6, an information converter 9, an HDMI transceiver 13, a storage unit 19 and a controller 20.

The DVD-driving unit 3, which includes a spindle motor or a focus motor for rotating the DVD 2, is controlled by a servo circuit (not shown). The signal-reading unit 4 is disposed at a position at which the record of the DVD 2 can be read and connected to the signal-processing unit 5. The signal-reading unit 4 includes an optical pickup portion. The signal-processing unit 4 also reads management information, a mark, a space, and the like recorded in the DVD 2 to transmit them to the signal-processing unit 5.

The signal-processing unit 5, which is connected to the AV decoder 6 and is connected to the controller 20 through a communication line, is controlled by the controller 20. That is, the signal-processing unit 5 includes a signal-processing circuit for converting the mark and the space from the signal-reading unit 4 into digital data, a demodulation circuit for demodulating the digital data which has been encoded by an 8/16 modulation and has been converted, and an error correcting circuit for correcting an error of the demodulated digital data. The signal-processing unit 5 generates a program stream in which a signal of image information including a stationary image and a movie or audio information is multiplexed from the mark and the space. The program stream is separated into a digital signal including image information of an MPEG format and audio information of an AC3 format. The separated image information is transmitted to the AV decoder 6 and the separated audio information is also transmitted to the AV decoder 6.

The AV decoder 6 is connected to the signal-processing unit 5 and an image information processing unit and is also connected to the controller 20 through the communication line. The AV decoder 6 is controlled by the controller 20. The AV decoder 6 includes an MPEG decoder 7 and a GUI generating unit 8 for generating display condition information of the HDMI monitor 21 as GUI, which will be described below. When acquiring the image information from the signal-processing unit 5, the AV decoder 6 decodes the image information into a signal of a predetermined format. In addition, the AV decoder 6 transmits to the information converter 9 the GUI image information, in which the decoded image information and the display condition information of the HDMI monitor 21 are generated as GUI. After also decoding the input audio information into audio information of a predetermined format, the AV decoder 6 transmits the decoded audio information to the HDMI transceiver 13 through the information converter 9.

That is, when acquiring the image information from the signal-processing unit 5, the MPEG decoder 7 decodes the image information into a signal of a predetermined format. In addition, the MPEG decoder 7 transmits the decoded image information to an image-quality adjusting unit 10 of the information converter 9 when the DVD recorder 1 outputs the image information, the GUI (graphical user interface) generating unit 8 acquires the setting of display conditions such as an image quality, an image display format, and a resolution from the HDMI monitor 21 or the storage unit 19 through the controller 20. In addition, when generating the GUI image information which includes the display conditions and can be configured by a user through the operation unit 18, the GUI generating unit 8 transmits the GUI image information from the HDMI transceiver 13 to the HDMI monitor 21.

The information converter 9 includes the image-quality adjusting unit 10, an image display format converter 11, and a resolution converter 12. The information converter 9 is connected to the AV decoder 6, a video encoder 14, and HDMI transceiver 13 and is also connected to the controller 20 through the communication line.

The information converter 9 receives the image information and the GUI image information from the AV decoder 6. According to the setting of the display conditions of the HDMI monitor 21, which are transmitted from the controller 20 through the communication line, the information converter 9 converts image quality of the input image information, the image display format, and the resolution on the basis of the command of the controller 20. In addition, the information converter 9 outputs the converted image information to the HDMI transceiver 13.

The information converter 9 transmits the converted image information to the video encoder 14 in order to output the image information as a form of an analog signal to an analog monitor. When receiving the image information from the AV decoder 6 described above, the image-quality adjusting unit 10 adjusts image quality of the image information input in accordance to the image quality of the set display conditions. Specifically, the image quality such as brightness or contrast of the image information displayed on the HDMI monitor 21 is adjusted In addition, the image-quality adjusting unit 10 transmits the adjusted image information to the image display format converter 11.

When receiving the adjusted image information from the image-quality adjusting unit 10, the image display format converter 11 converts an image display format of the image information input in accordance with the image display format of the set display condition. For example, the image-quality adjusting unit 10 converts the image display format of the image information into the image display format such as an interlace type or a progressive type of the input image information in the HDMI monitor 21. The image display format converter 11 transmits the converted image information to the resolution converter 12.

When receiving the converted image information, the resolution converter 12 converts the resolution of the image information input in accordance with the resolution of the set display condition. The resolution converter 12 also transmits the converted image information to the HDMI transceiver 13.

The HDMI transceiver 13 is connected to the controller 20 through the communication line and is also connected to the HDMI monitor 21 through the HDMI cable 17 and HDMI connectors 17a to 17c. When receiving the converted image information from the resolution converter 12, the HDMI transceiver 13 converts the converted image information into a predetermined format and transmits it to the HDMI monitor 21. In this case, after converting the converted image information into a digital signal conforming to an HDMI standard, the HDMI transceiver 13 transmits the converted image information to the HDMI monitor 21 through the HDMI cable 17 by using a TMDS (transition minimized differential signaling) type.

When receiving the GUI image information and the audio information from the information converter 9, the HDMI transceiver 13 converts the GUI image information and the audio information into a predetermined format and transmits the GUI image information and the audio information to the HDMI monitor 21. In addition, the HDMI transceiver 13 has an HPD (Hot Plug Detector) which detects whether or not the DVD recorder 1 and the HDMI monitor 21 are connected to each other through the HDMI cable 17. In addition, the HDMI transceiver 13 transmits a signal for detecting whether or not the connection thereof is made to the controller 20 through the communication line.

The video encoder 14 is connected to the information converter 9 and a video amp 15. When receiving the image information of which the image quality or the image display format is converted from the image display format converter 11, the video encoder 14 converts the image information into a signal for analog output. In addition, the video encoder 14 transmits the converted image information to the video amp 15.

An analog monitor is connected to the video amp 15 by an analog cable through an output terminal 16.

The HDMI connectors 17a to 17c correspond to the HPD, the TMDS, and a DDC, respectively. The DDC (display data channel) is a line for transmitting to the DVD recorder 1 other information about the HDMI monitor 21 in addition to the display condition of the image information and the audio condition of the audio information. In the DVD) recorder 1, the DDC is connected to the communication line and configured to establish a line between the DVD recorder 1 and the HDMI monitor 21.

The operation unit 18 includes various input keys in addition to the a key for displaying the display condition of the HDMI monitor 21 and an output terminal of the operation unit 18 is connected to the controller 20. In the operation unit 18, a command signal is transmitted to the controller 20 when an input key is operated.

The controller 20 is connected to the signal-processing unit 5, the AV decoder 6, the information converter 9, the HDMI transceiver 13, the HDMI cable 17, and the like through the communication line. The controller 20 controls an operation for recording or reproducing the image and audio data. The controller 20 includes the storage unit 19 which stores information related to a display language such as used in a menu or a caption. When the DVD recorder 1 and the HDMI monitor 21 are connected to each other, the controller 20 performs an information processing operation such as setting change in the display language. The controller 20 also determines a standard of the condition information about whether the connected HDMI monitor 21 is an HDMI standard or a DVI standard on the basis of an input registration identifier. The standard of the condition information input to the controller 20 is specified by the determination of the controller 20. In addition, the HDMI transceiver 13 converts the converted image information into a signal of a predetermined format to transmit the signal to the HDMI monitor 21. In this embodiment, since the HDMI monitor 21 of the HDMI standard is connected to the DVD recorder 1, the controller 20 determines that a standard of the condition information acquired from the HDMI monitor 21 is the HDMI standard. The controller 20 issues a command to the HDMI transceiver 13 and transmits the image information which is converted into a digital signal conforming to HDMI standard.

At this time, the HDMI monitor 21 includes an HDMI receiving unit 22 and a displaying screen, as shown in FIG. 2. The HDMI receiving unit 22 receives the converted digital signal which has been transmitted from the DVD recorder 1 as the form of the TMDS type.

An image is displayed on the basis of the received and converted image information. In addition, the HDMI receiving unit 22 transmits the received digital signal to the HDMI monitor 21 to display the image information.

The HDMI receiving unit 22, which is connected to the DDC, transmits a known EDID data structure (not shown) as the condition information to the DVD recorder 1.

An EDID (Extended Display Identification Data) memory 23 stores data for recognizing display information of an external device (in this case, the DVD recorder 1) from the HDMI monitor 21. This display information includes language information (language such as used in a menu or a caption), display control information resolution or the number of pixels), and the like. In addition, the language information is based on a language of a nation in which the HDMI monitor 21 is used, but the language information other than English is also stored.

An HDCP (High Band Digital Content Protection) memory 24 stores key data for controlling a copy protect of a digital signal input through the HDMI connector. In addition, a video outputting unit 25 and an audio outputting unit 27 are connected to the HDMI monitor 21. The video outputting unit 25 converts a digital image signal into an analog video signal to transmit the converted signal to an output terminal 26. On the other hand, the audio outputting unit 27 converts a digital audio signal into an analog audio signal to transmit the converted signal to an output terminal 28.

Figure 7:
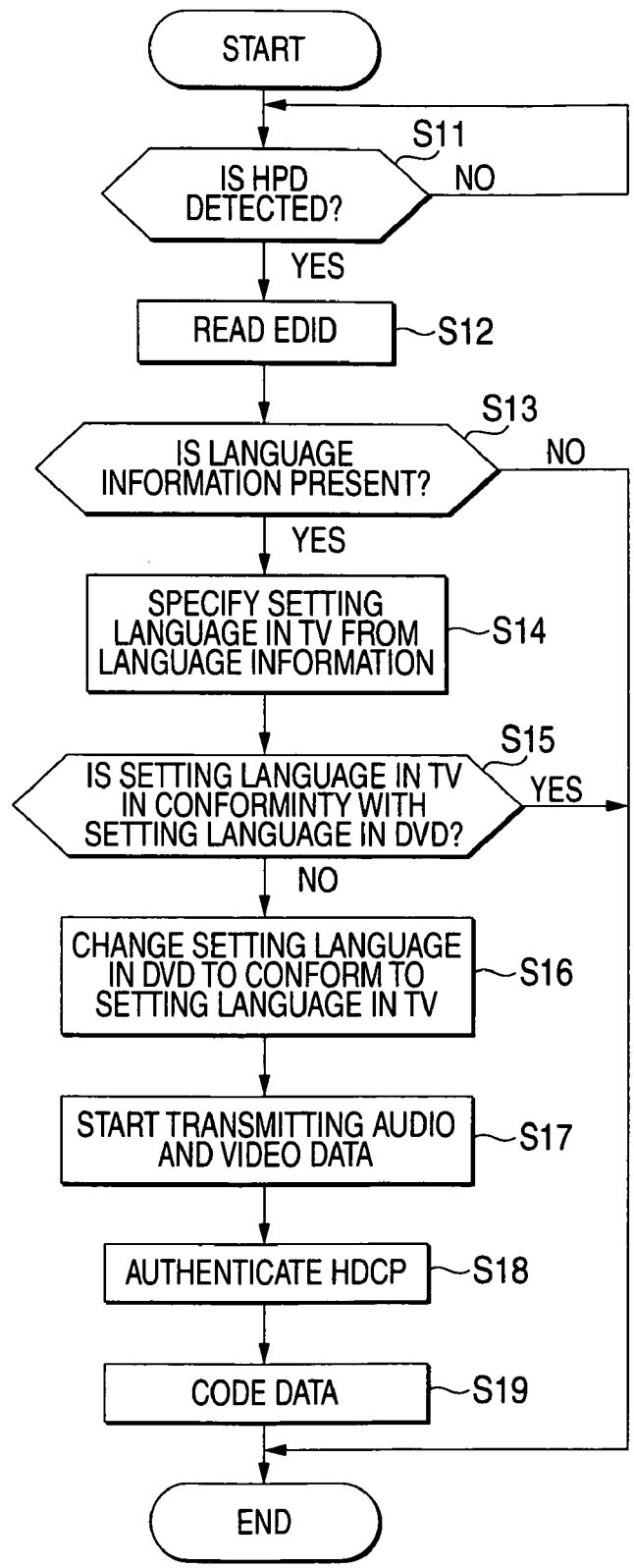
FIG. 7 is a flowchart for explaining a language setting operation.

Next, a language setting operation will be described with reference to a flowchart of FIG. 7. Here, a case where a user connects a new DVD recorder 1 to an HDMI monitor (TV) 21 to use the new DVD recorder 1 will be described. The DVD recorder 1 is connected to the HDMI monitor 21 via connectors 17a to 17c in the HDMI cable 17.

First, the controller 20 determines whether to detect the HPD when a power source is turned on (step S11). That is, on the basis of the input registration identifier, the controller 20 determines whether the connected HDMI monitor 21 is a standard of condition information of an HDMI standard or a standard of condition information of a DVI standard. In this case, since the user connects the DVD recorder 1 to the TV 21 in advance, the HPD is detected.

After detecting the HPD, the controller 20 reads the EDID (step S12). Subsequently, the controller 20 determines whether the language information is present in the EDID memory 23 (step S13). If the language information is not stored in the EDID memory 23 in advance, the controller 20 cannot read it. Consequently, the controller 20 determines that the language information is not present, and thus terminates the language setting operation.

Alternatively, if the language information is present in the EDID memory 23, a language set in the TV 21 is specified from the language information (step S14). Subsequently, the controller 20 determines whether the language set in the DVD record 1 is equal to the language set in the TV 21 (step S15).

When the set languages are equal to each other, the language setting operation is terminated. That is because it is not necessary to change the language set in the DVD recorder 1 to be in conformity with the language set in the TV 21.

Alternatively, if the languages are not equal to each other, the language set in the DVD recorder 1 is set so as to be in conformity with the language set in the TV 21 (step S16).

Figure 3:
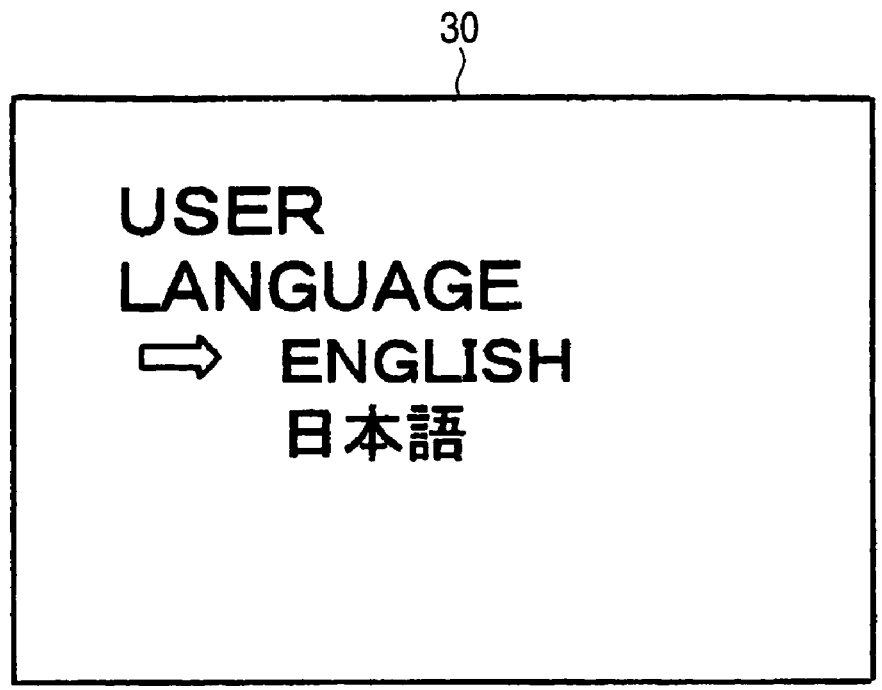
FIG. 3 is a diagram illustrating a screen on which an example of a language is shown before a language setting operation.
Figure 4:
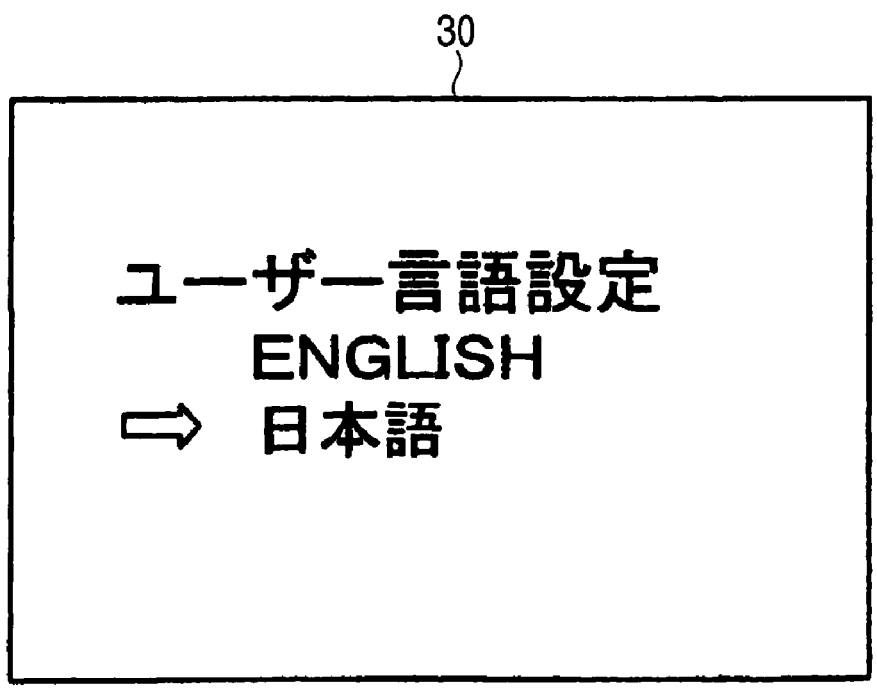
FIG. 4 is a diagram illustrating the screen on which the example of the language is shown after the language setting operation.
Figure 5:
FIG. 5 is a diagram illustrating the screen on which an example of another language is shown before the language setting operation.
Figure 6:
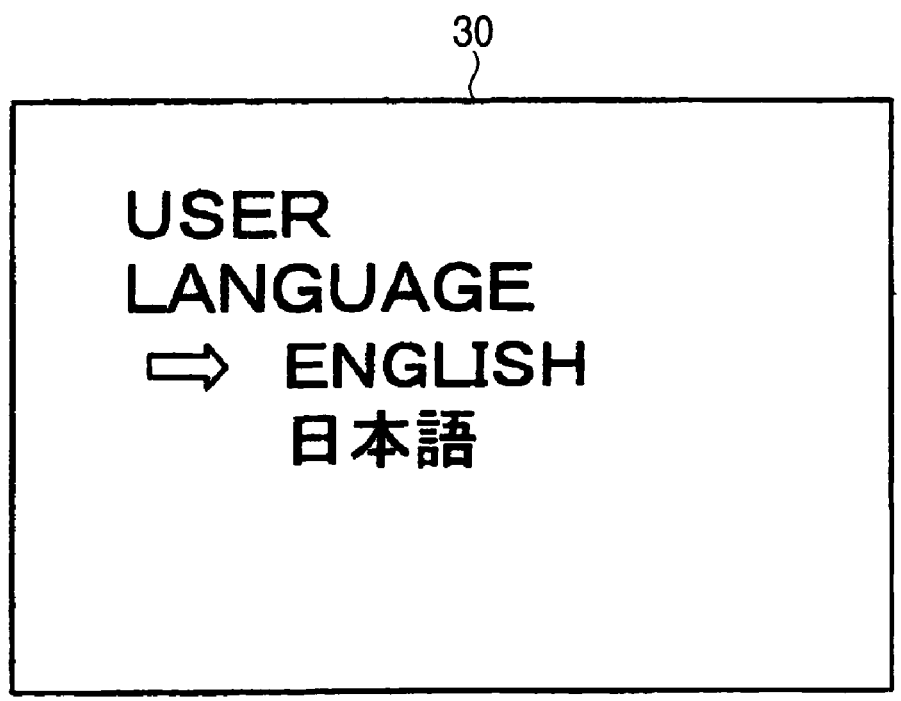
FIG. 6 is a diagram illustrating the screen on which an example of another language is shown after the language setting operation.

For example, in a case where a menu setting language of the TV 21 is Japanese, if a title of the screen 30 is displayed as "USER LANGUAGE" and an arrow points to "ENGLISH" to show the menu display in English as shown in FIG. 3, the language used in the DVD recorder 1 is changed into Japanese, the title of the screen is displayed as "ユーザー言語設定",and the arrow points to "日本語"as shown in FIG. 4. In addition, in a case where the menu setting language of TV 21 is English, if the title of the screen 30 is displayed as "ユーザー言語設定",and the arrow points to "日本語"to show the menu display in Japanese as shown in FIG. 5, the language used in the DVD recorder 1 is changed into English, the title of the screen is displayed as "USER LANGUAGE" and the arrow points to " 英 語 "in FIG. 6. Consequently, when a user sets various types of items in menus before use of the DVD recorder 1, the characters are displayed in a language which the user understands. Consequently, for example, it is possible to easily perform an initial setting operation.

Subsequently, the controller 20 starts to transmit the audio and video data (step S17).

The HDCP is authenticated from the HDCP memory 24 of the TV 21 (step S18). Since the HDMI monitor 21 conforming to the HDMI standard stores a security code to the HDCP memory 24 for copyright protection, the authentication is immediately performed and communication between both parties is possible.

Subsequently, the controller 20 codes data (step S19). In this case, since the HDCP memory 24 stores the key data for controlling the copy protect input through an HDMI connector, the data is coded without trouble. When the data starts to be coded, a series of language setting operations are terminated.

In a case where a new DVD recorder 1 is connected to the HDMI monitor 21, a language which a user uses is displayed. Consequently, it is possible to solve inconvenience generated due to a language which could not be understood in a known example.

In addition, it is possible to solve the problem that a television monitor could not be effectively used since a setting operation does not proceed in a case where a menu is displayed on the screen to perform various setting operations.

In addition, it is possible to solve the problem that an AV device could not be effectively used since the setting operation does not proceed in a case where a menu is displayed on the display screen of the AV device to perform various setting operations when the AV device such as a video camera or an audio combo is connected to the DVD recorder 1 and used.

In addition, it is possible to easily understand a display image in a language which a user can understand in that the display language contains a caption displayed on the screen.

In this embodiment, the case where the invention is applied to the DVD recorder 1 has been described. However, the invention may be also applied to a hard disk recorder capable of copying the record data in a DVD after image and audio data of a television broadcast program is updated and recorded in a hard disk (HD).

The information recording and reproducing apparatus according to the invention is not limited to the above-described embodiment, but may be modified in various forms without departing from the gist of the invention.

What is claimed is:

1. An information recording and reproducing apparatus comprising:
    an HDMI connector adapted to be connected to a display device conforming to an HDMI standard;
    a signal processor operable to decode a digital signal received through the HDMI connector and extract first language information which indicates a setting language of the display device when the digital signal contains the first language information;
    a storage operable to store second language information which indicates a setting language of the information recording and reproducing apparatus;
    a controller operable to detect whether the display device is connected to the HDMI connector, acquire the first language information when the display device is connected to the HDMI connector, determine whether the setting language in the first language information is in conformity with the setting language in the second language information, and change the setting language in the second language information so as to be in conformity with the setting language in the first language information when the setting languages are not in conformity with each other.

2. The information recording and reproducing apparatus as set forth in claim 1, wherein the display device includes a television monitor.

3. The information recording and reproducing apparatus as set forth in claim 1, wherein the display device includes an AV device provided with an audio output unit.

4. The information recording and reproducing apparatus as set forth in claim 1, wherein a menu or a caption in visual information output from the recording and reproducing apparatus to the display device is displayed on a screen of the display device in the setting language in the second language information.

5. A method for changing a setting language of an information recording and reproducing apparatus, comprising:
    detecting whether a display device conforming to an HDMI standard is connected to an HDMI connector in the information recording and reproducing apparatus;
    receiving a digital signal from the display device through the HDMI connector;
    extracting language information which indicates a setting language of the display device from the digital signal;
    determining whether the setting language of the display device is in conformity with the setting language of the information recording and reproducing apparatus; and
    changing the setting language of the information recording and reproducing apparatus so as to be in conformity with the setting language of the display device when the setting languages are not in conformity with each other.

\* \* \* \* \*